United States Patent
Kim et al.

(10) Patent No.: US 11,935,237 B2
(45) Date of Patent: *Mar. 19, 2024

(54) METHOD FOR DISCRIMINATING SUSPICIOUS LESION IN MEDICAL IMAGE, METHOD FOR INTERPRETING MEDICAL IMAGE, AND COMPUTING DEVICE IMPLEMENTING THE METHODS

(71) Applicant: Lunit Inc., Seoul (KR)

(72) Inventors: Hyo-Eun Kim, Seoul (KR); Hyeonseob Nam, Seoul (KR)

(73) Assignee: LUNIT INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,492

(22) Filed: Mar. 30, 2023

(65) Prior Publication Data
US 2023/0252626 A1    Aug. 10, 2023

Related U.S. Application Data

(63) Continuation of application No. 17/721,515, filed on Apr. 15, 2022, now Pat. No. 11,663,718, which is a
(Continued)

(30) Foreign Application Priority Data

May 24, 2019  (KR) ................ 10-2019-0061504
Apr. 29, 2020  (KR) ................ 10-2020-0052601

(51) Int. Cl.
*G06T 7/00*    (2017.01)
*G06N 3/08*    (2023.01)
(Continued)

(52) U.S. Cl.
CPC ............. *G06T 7/0012* (2013.01); *G06N 3/08* (2013.01); *G06V 10/40* (2022.01); *G06V 10/764* (2022.01);
(Continued)

(58) Field of Classification Search
CPC ......... G06T 7/0012; G06T 2207/20081; G06T 2207/20084; G06T 2207/30068;
(Continued)

(56) References Cited

U.S. PATENT DOCUMENTS 10,936,160 B2 * 3/2021 Sieniek ............... G06N 5/04
2010/0056944 A1 * 3/2010 Keith ................... A61B 5/015
600/549

(Continued)

*Primary Examiner* — Van D Huynh
(74) *Attorney, Agent, or Firm* — LEX IP MEISTER, PLLC

(57) ABSTRACT

A method for interpreting an input image by a computing device operated by at least one processor is provided. The method for interpreting an input image comprises storing an artificial intelligent (AI) model that is trained to classify a lesion detected in the input image as suspicious or non-suspicious and, under a condition of being suspicious, to classify the lesion detected in the input image as malignant or benign-hard representing that the lesion is suspicious but determined to be benign, receiving an analysis target image, by using the AI model, obtaining a classification class of a target lesion detected in the analysis target image and, when the classification class is the suspicious, obtaining at least one of a probability of being suspicious, a probability of being benign-hard, and a probability of malignant for the target lesion, and outputting an interpretation result including at least one probability obtained for the target lesion.

18 Claims, 7 Drawing Sheets

Related U.S. Application Data continuation of application No. 16/874,926, filed on May 15, 2020, now Pat. No. 11,334,994.

(51) Int. Cl.
  *G06V 10/40* (2022.01)
  *G06V 10/764* (2022.01)

(52) U.S. Cl.
  CPC .............. *G06T 2207/20081* (2013.01); *G06T 2207/20084* (2013.01); *G06T 2207/30068* (2013.01); *G06T 2207/30096* (2013.01)

(58) Field of Classification Search
  CPC ............ G06T 2207/30096; G06K 9/46; G06K 2209/05; G06K 9/628; G06K 9/6282; G06N 3/08; G06N 3/0454; G06N 20/00
  See application file for complete search history.

(56) References Cited

U.S. PATENT DOCUMENTS

| | | | |
|---|---|---|---|
| 2011/0026798 A1* | 2/2011 | Madabhushi | G01R 33/56 |
| | | | 382/131 |
| 2013/0343626 A1* | 12/2013 | Rico | A61B 5/7264 |
| | | | 382/131 |
| 2018/0336395 A1* | 11/2018 | Madabhushi | G16H 50/30 |
| 2018/0357512 A1* | 12/2018 | Zhang | G06V 10/771 |
| 2019/0015059 A1* | 1/2019 | Itu | A61B 6/025 |
| 2020/0151877 A1* | 5/2020 | Hattori | G06V 10/454 |
| 2020/0226368 A1* | 7/2020 | Bakalo | G06N 3/045 |
| 2020/0364855 A1* | 11/2020 | Ha | G16H 50/30 |
| 2021/0407655 A1* | 12/2021 | Ohyu | G06F 17/18 |

\* cited by examiner

METHOD FOR DISCRIMINATING SUSPICIOUS LESION IN MEDICAL IMAGE, METHOD FOR INTERPRETING MEDICAL IMAGE, AND COMPUTING DEVICE IMPLEMENTING THE METHODS

CROSS-REFERENCE TO RELATED APPLICATION

This application is a Continuation Application of U.S. patent application Ser. No. 17/721,515 filed on Apr. 15, 2022, which is a Continuation Application of U.S. patent application Ser. No. 16/874,926, which was filed on May 15, 2020, which claims priority to and the benefit of Korean Patent Application No. 10-2019-0061504, filed in the Korean Intellectual Property Office on May 24, 2019, and Korean Patent Application No. 10-2020-0052601, filed in the Korean Intellectual Property Office on Apr. 29, 2020, the entire contents of each of which are incorporated herein by reference.

BACKGROUND

(a) Field

The present disclosure relates to medical image interpretation technology based on artificial intelligence (AI).

(b) Description of the Related Art

Machine learning technology, represented by deep learning, provides high-performance results surpassing the results of the existing methods in various data analysis such as an image analysis, an audio analysis, a text analysis and the like. In addition, the machine learning technologies have been introduced various fields due to the extensibility and flexibility inherent therein, and various types of neural networks have been disclosed.

As such, AI technology based on machine learning has been actively introduced in the medical field. Formerly, a computer aided detection (CAD) device detected lesions in a rule based manner or in a candidate area designated in a medical image. Oppositely, current AI-based medical image interpretation technology may analyze the whole medical image with an AI algorithm and visually provide a lesion of abnormality.

Medical staff may receive malignant lesion information included in the medical image from the diagnosis assistance system where the AI-based medical image interpretation technology is implemented, and make a diagnosis with reference to the information. At this time, if a lesion is determined to be suspicious of a cancer (hereinafter, referred to as "suspicious" in brief) by a medical staff but determined to be benign by the diagnosis assistance system, the diagnosis assistance system may not provide the lesion information on the screen. In this case, the medical staff cannot distinguish whether the diagnosis assistance system makes a wrong decision or does not display the lesion because the lesion is benign. In the end, even though the diagnosis assistance system did not indicate because the suspicious lesion is benign, the medical staff may misunderstand that the diagnosis assistance system does not properly discriminate a suspicious lesion. Consequentially, the reliability of the diagnosis assistance system deteriorates.

SUMMARY

The present disclosure provides a method for providing information on a suspicious lesion that is determined to be benign as a result of medical image interpretation, and a computing device implementing the method.

The present disclosure provides a method for training an AI model that discriminates a suspicious lesion in a medical image and classifies the suspicious lesion as a malignant class or a benign class by using training data, and a computing device implementing the method.

The present disclosure provides a method for discriminating a suspicious lesion and a malignant lesion that are determined to be benign in medical images and providing an interpretation result including information of the suspicious lesion or the malignant lesion, by using a trained AI model, and a computing device implementing the method.

According to an embodiment, a method for interpreting an input image by a computing device operated by at least one processor is provided. The method for interpreting an input image includes storing an artificial intelligent (AI) model that is trained to classify a lesion detected in an input image as a suspicious class or a non-suspicious class and, under a condition of being suspicious, to classify the lesion detected in the input image as a malignant class or a benign-hard class representing that the lesion is suspicious but benign, receiving an analysis target image, by using the AI model, obtaining a classification class of a target lesion detected in the analysis target image and, when the classification class is the suspicious class, obtaining at least one of a probability of being suspicious, a probability of being benign-hard, and a probability of malignant for the target lesion, and outputting an interpretation result including at least one probability obtained for the target lesion.

The artificial intelligence may include a feature extraction model that is trained to output a feature of the input image, a first branch classification model that is trained to classify the feature of the input image as the suspicious class or the non-suspicious class, and a second branch classification model that is trained to classify the feature of the input image as the malignant class or the benign-hard class under a condition of being suspicious. A classification result of the second branch classification model may be selectively reflected in the interpretation result according to a classification result of the first branch classification model.

The first branch classification model may include a classification model that learns a task to classify a feature of a training medical image into groups to which the training medical image belongs. The groups may include a non-suspicious group and a suspicious group.

The second branch classification model may include a classification model that learns a task to classify the feature of the training medical image which belongs to a suspicious group with a label annotated to the training medical image. The label may indicate the suspicious class or the benign-hard class.

In the interpreting method, the first branch classification model and the second branch classification model may be independently trained.

Outputting the interpretation result may include outputting an interpretation result including indication information representing that the target lesion is benign-hard and the probability of being benign-hard, when the classification class of the target lesion is a benign-hard class being a lower classification of the suspicious class, and outputting an interpretation result including indication information representing that the target lesion is malignant and the probability of being malignant, when the classification class of the target lesion is a malignant class being a lower classification of the suspicious class.

The probability of being suspicious may be a probability that the AI model classifies the target lesion as the suspicious class. The probability of being benign-hard may be calculated through multiplying the probability of being suspicious and a probability that the target lesion is classified as the benign-hard class under a condition of being suspicious by the AI model. The probability of being malignant may be calculated through multiplying a probability of being suspicious and a probability that the target lesion is classified as the malignant class under a condition of being suspicious by the AI model.

The method for interpreting the input image may further include obtaining at least one of a probability of being non-suspicious, a probability of being benign, and a probability of being normal for the target lesion, when the target lesion is classified as the non-suspicious class by the AI model further trained to classify a lesion classified as the non-suspicious class into a normal class or a benign class.

According to an embodiment, a method for interpreting an input image by a computing device operated by at least one processor may be provided. The method for interpreting an input image may include receiving an analysis target image, classifying a lesion detected in the analysis target image as a suspicious class or a non-suspicious class by using a first branch classification model, and calculating a probability that the lesion is classified as the suspicious class, classifying the lesion as a malignant class or a benign-hard class representing that the lesion is benign but suspicious by using a second branch classification model, and calculating a probability that the lesion is classified as the malignant class or the benign-hard class under a condition of being suspicious, and outputting an interpretation result generated by using a classification result of the second branch classification model, when the lesion is classified as the suspicious class by the first branch classification model. The interpretation result may include indication information representing that the lesion is malignant and a probability of being malignant, or indication information representing that the lesion is benign and a probability of being benign.

The probability of being benign may be calculated through multiplying a probability that the lesion is classified as the suspicious class and a probability that the lesion is classified as the benign-hard class under a condition that the lesion is suspicious.

The probability of being malignant may be calculated through multiplying a probability that the lesion is classified as the suspicious class and a probability that the lesion is classified as the malignant class under a condition that the lesion is suspicious.

Calculating the probability that the lesion is classified as the suspicious class may include obtaining a primary classification class of the lesion and a probability that the lesion is classified as the suspicious class by using the first branch classification model that learns a task to classify a feature of a training medical image into groups to which the medical image belongs. The groups may include a non-suspicious group and a suspicious group.

Calculating the probability that the lesion is classified as the malignant class or the benign-hard class under a condition that the lesion is suspicious may include obtaining a secondary classification class and a probability that the lesion is classified as the malignant class or the benign-hard class under a condition that the lesion is suspicious, by using the second branch classification model that learns a task to classify the feature of the training medical image belonging to the suspicious group with a label annotated to the medical image. The label may indicate the malignant class or the benign-hard class.

According to an embodiment, computing device is provided. The computing device may include a memory that stores an artificial intelligent (AI) model that is trained to classify a lesion detected in an input image as a suspicious class or a non-suspicious class and, under a condition that the lesion is suspicious, to classify the lesion detected in the input image as a malignant class or a benign-hard class representing that the lesion is benign but suspicious, and a processor that identifies a classification class of the target lesion detected in an analysis target image, and, when the classification class is the suspicious class, obtains at least one of a probability of being suspicious, a probability of being benign-hard, and a probability of being malignant for the target lesion, and outputs an interpretation result including at least one probability obtained for the target lesion, by using the AI model.

The AI model is may include a convolutional neural network-based feature extraction model that is trained to output a feature for detecting a lesion in the input image, a first branch classification model that is trained to classify the feature of the input image as the suspicious class or the non-suspicious class, and a second branch classification model trained to classify feature of the input image as the malignant class or the benign-hard class. A classification result of the second branch classification model may be selectively reflected in the interpretation result according to a classification result of the first branch classification model.

The first branch classification model may be a classification model that learns a task to classify an input image as the suspicious class or the non-suspicious class, by using medical images grouped into the suspicious class or the non-suspicious class. The second branch classification model may be a classification model that learns a task to classify an input image as the malignant class or the benign-hard class, by using the medical images grouped as the suspicious class and labels annotated to the medical images. The annotated label may indicate the malignant class or the being-hard class.

The processor may branch an output of the feature extraction model constituting the AI into the first branch classification model and the second branch classification model, and independently train the first branch classification model and the second branch classification model by using training data.

The processor may generate the AI model by parallel-connecting the trained first branch classification model and the trained second branch classification model to the feature extraction model, and generates the interpretation result using the classification result of the second classification model, when the classification class of the first branch model for the feature extracted by the feature extraction model is the suspicious class.

The processor may output an interpretation result including indication information representing that the target lesion is benign-hard and a probability of being benign-hard, when the classification class of the target lesion is a benign-hard class being a lower classification class of the suspicious class. The probability of being benign-hard may be calculated through multiplying a probability that the suspicious lesion is classified as the suspicious class by the AI model and a probability that the detected lesion is classified as the benign-hard class under a condition that the lesion is suspicious.

The processor may output an interpretation result including indication information representing that the target lesion is malignant and the probability of being malignant, when the classification class of the target lesion is a malignant class being a lower classification class of the suspicious class. The probability of being malignant may be calculated through multiplying a probability that the lesion is classified as the suspicious class and a probability that the lesion is classified as the benign-hard class under a condition that the lesion is suspicious.

According to an embodiment, the computing device detects a lesion that is suspected to be malignant in a medical image and classifies the lesion into a lesion to be determined as benign or malignant through additional examinations (for example, biopsy). Therefore, the medical staff may recognize that the computing device properly analyzes suspicious lesions without being missed and can rely on the interpretation result of the computing device.

According to an embodiment, the computing device discriminates a lesion that is interpreted as suspicious but determined to be benign in the additional examinations. Unnecessary additional examinations such as image taking, biopsy, and the like may be reduced.

According to an embodiment, since an AI model can discriminate a lesion in a medical image as normal, benign-easy, benign-hard, and cancer, an explainable AI (eXplainable AI, XAI) for the interpretation result may be provided.

According to the embodiment, the classification models of the AI model are independently trained. Learning variations that may be caused by classification classes having different learning difficulties may be eliminated. Further, since the classification results of lower classification models are selectively reflected in the interpretation result according to the classification result of the upper classification model, prediction probabilities of classification models each of which independently operates may be provided without any conflict.

DETAILED DESCRIPTION OF THE EMBODIMENTS

Figure 1:
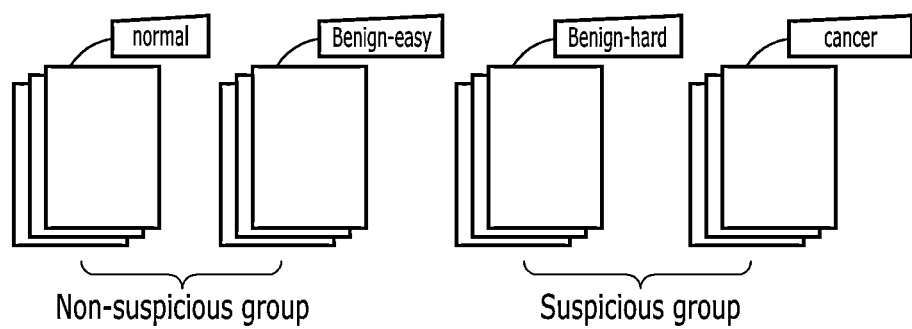
FIG. 1 is a diagram for explaining training data of an AI model according to an embodiment.

Hereinafter, embodiments of the present disclosure will be described in detail with reference to the attached drawings so that the person of ordinary skill in the art may easily implement the present disclosure. The present disclosure may be modified in various ways and is not limited thereto. In the drawings, elements irrelevant to the description of the present disclosure are omitted for clarity of explanation, and like reference numerals designate like elements throughout the specification.

Throughout the specification, when a part is referred to "include" a certain element, it means that it may further include other elements rather than exclude other elements, unless specifically indicates otherwise. In addition, the term such as " . . . unit", " . . . block", " . . . module", or the like described in the specification mean a unit that processes at least one function or operation, which may be implemented with a hardware, a software or a combination thereof.

In the specification, a task refers to an assignment to be solved through machine learning or a job to be performed through machine learning. For example, when it is assumed that recognition, classification, prediction, and the like are to be performed from a medical image, each of recognition, classification, and prediction may correspond to an individual task. The AI model of the present invention is a model that learns at least one task, and may be implemented as a software/program executed on a computing device. The program is stored on a non-transitory storage media and includes instructions described as to perform operations of the present invention by a processor. The program may be downloaded via a network or sold as a product.

The present disclosure may be applied to medical images of various parts photographed with various modalities. For example, modalities of medical images may be various such as X-ray, magnetic resonance imaging (MRI), ultrasound, computed tomography (CT), mammography (MMG), and digital breast tomosynthesis (DBT), and the like.

First, a method for interpreting a medical image in a hospital and detecting a malignant lesion will be described. For example, when suspicious lesion is discriminated in a mammogram image, the doctor checks whether the suspicious lesion is malignant through a recall (e.g., breast ultrasound, MRI, and biopsy) for the patient. If the suspicious lesion is determined as malignant through biopsy, surgery and therapy are performed.

Meanwhile, though a suspicious lesion is discriminated in the mammogram image, it may be determined as false positive through biopsy. In this case, the patient may be relieved of such a result. But, the patient would have remained psychologically unstable until the suspicious lesion is definitely diagnosed as false positive, and should pay for additional examinations such as imaging, biopsy, and the like. Therefore, accurate image interpretation is required for the sake of patients. However, even being a skilled doctor, it is not easy to discriminate a suspicious lesion in an image as benign without additional examinations. Based on reports from the academic community, in the case of mammography, it is said that about 90 to 95% of suspicious lesions are diagnosed as false positive through additional examinations. Thus, accurate diagnosis of being benign or malignant for the suspicious lesion is required.

Recently, a doctor may receive malignant lesion information included in a medical image from a diagnosis assistance system where an AI-based medical image interpretation technology is implemented and may diagnose with reference thereto. Deep learning-based Mammography computer-aided detection/diagnosis (CAD) may gradually improve the ability to detect malignant lesions and reduce the false positive rate.

On the other hand, since the diagnosis assistance system so far has been trained to detect a malignant lesion, it does not provide lesion information diagnosed as not malignant even though the performance of detecting malignant lesion has been improved. Thus, new issues described as following are on the rise. When a doctor notices a suspicious lesion but the diagnosis assistance system does not detect a suspicious lesion, the doctor cannot determine whether the diagnosis assistance system did not precisely detect the malignant lesion or the suspicious lesion is benign. In particular, if a doctor is less skilled or is not trained for interpreting medical images in the corresponding field, the probability that the suspicious lesion to be diagnosed as benign is suspected as malignant may increase. In such a case, the diagnosis assistance system may be mistaken as not to detect malignant lesions properly. Such an issue may obstruct utilization of current AI-based medical image interpreting products. New AI models that provide medical staffs reliable interpretation results are required.

In order to solve such issues, a method for providing information of a suspicious lesion to be diagnosed as benign by using an AI model without additional examinations will be described below. Here, the AI model is trained to distinguish a benign lesion and a malignant lesion through image interpretation for a suspicious lesion.

FIG. 1 is a diagram for explaining training data of an AI model according to an embodiment.

Referring to FIG. 1, the AI model learns features of medical images corresponding to classification classes based on the training data, and a task to classify a lesion/disease into a plurality of classes based on the features.

The plurality of classes may include classification classes that can be grouped and can be categorized according to hierarchical relationships. In the following description, classification classes for lesions are described as examples of a plurality of classes. In particular, it is assumed that non-suspicious, benign-hard (that is, suspicious but benign), and malignant (that is, cancer) are included.

The benign-hard and malignant are included in the suspicious class and correspond to a sub-class of the suspicious. The normal and benign-easy belong to the non-suspicious class and corresponds to a sub-class of the non-suspicious. Meanwhile, the AI model may classify medical images into non-suspicious class without distinguishing between normal and benign-easy. Additionally, the AI model may classify medical images into malignant and non-malignant, or into benign and non-benign. The terms "Benign-hard" and "benign-easy" refer to the interpretability degree indicating how easy to determine as benign. For the convenience of explanation, being malignant may be used interchangeably with the term "cancer".

Here, a benign-easy lesion refers to a benign lesion that may be easily discriminated as benign since it is not suspected to be malignant in image interpretation. A benign-hard lesion refers to a lesion that has difficulty in being determined as benign because it is suspected as being malignant in the image interpretation but diagnosed as being benign in the additional examinations. A malignant lesion refers to a lesion that is suspected as being malignant in the image interpretation and diagnosed as malignant in additional examinations.

Hereinafter, class distinction is expressed as a classification, but classification may be expressed as a discrimination or grouping. Thus, "discrimination", "grouping", and "classification" may be used interchangeably and be substituted for each other.

The training data for training the AI model consists of each medical image and a label annotated with classification class thereof. For example, the training data may be medical images annotated with normal, benign-easy, benign-hard, and cancer. At this time, an image annotated with normal and an image annotated with benign-easy may be additionally annotated with non-suspicious. An image annotated with benign-hard and an image annotated with cancer may be additionally annotated with suspicious.

A normal image refers to an image that is determined as normal in image interpretation. To improve accuracy, images of patients whose images photographed after a predetermined period (e.g., 1 year) are confirmed as normal may be collected as training data.

A benign-easy image refers to an image determined as benign in image interpretation. To improve accuracy, images of patients whose images photographed after a predetermined period (e.g., 1 year) are still diagnosed as benign may be collected as training data.

A benign-hard image refers to an image that is determined as suspicious in image interpretation and finally diagnosed as benign through additional examinations (for example, biopsy).

A cancer image refers to an image that is determined as suspicious in image interpretation and finally diagnosed as cancer through additional examinations.

On the other hand, even if medical images annotated with normal, benign-easy, benign-hard, and cancer are collected as training data, it is not easy to distinguish benign-hard lesion from cancer lesion in medical images with known general classification models.

For example, even though a classification model learns a task to classify an input image as non-suspicious, benign-hard, and cancer, distinguishing benign-hard from cancer is more difficult than distinguishing benign-hard/cancer from non-suspicious. Thus, the classification model is not good at learning to classify as benign-hard and cancer, and may tend to concentrate on learning to classify non-suspicious.

Alternatively, the classification model may include a first model that classifies the input image into non-suspicious and suspicious, and a model that classifies the input image into cancer and non-cancer. This classification model outputs classified results by the two models for the input image. At this time, since the two models independently calculate a probability of being suspicious and a probability of cancer without any correlation between the two models, the prediction results from the two models may conflict. For example, if for an input image the probability of being suspicious is predicted as 0.1 but the probability of cancer is predicted as 0.9, a confusing interpretation result may be obtained.

In order to solve this problem, the present disclosure groups medical images annotated with normal, benign-easy, and cancer into suspicious class and non-suspicious class that are higher classification class, and utilize the hierarchically grouped training data for training the classification models of the AI model.

Here, each of the classification models of the AI model may independently learn training data that is grouped suitable for the classification class, thereby may eliminate learning variations that may be caused by classification classes having different learning difficulties. In addition, since the classification results of lower classification models are reflected in the interpretation result according to the classification result of the upper classification model due to the hierarchical relationship among the independently trained classification models, prediction probabilities of classification models each of which independently operates may be provided without any conflict.

Hereinafter, an AI model that detects a suspicious lesion in a medical image and distinguishes the suspicious lesion as malignant or benign using training data, a method for training the AI model, and a computing device implementing the method are described in detail with reference to the accompanying drawings.

Figure 2:
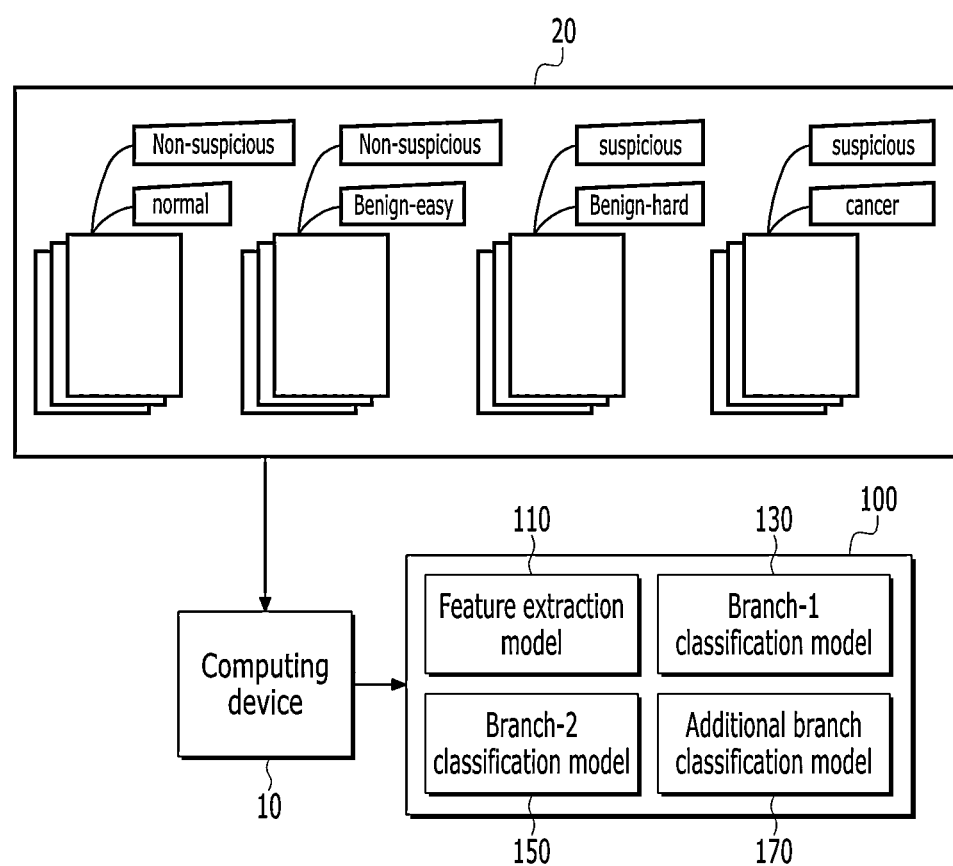
FIG. 2 is a conceptual diagram for explaining a method for training an AI model according to an embodiment.
Figure 3:
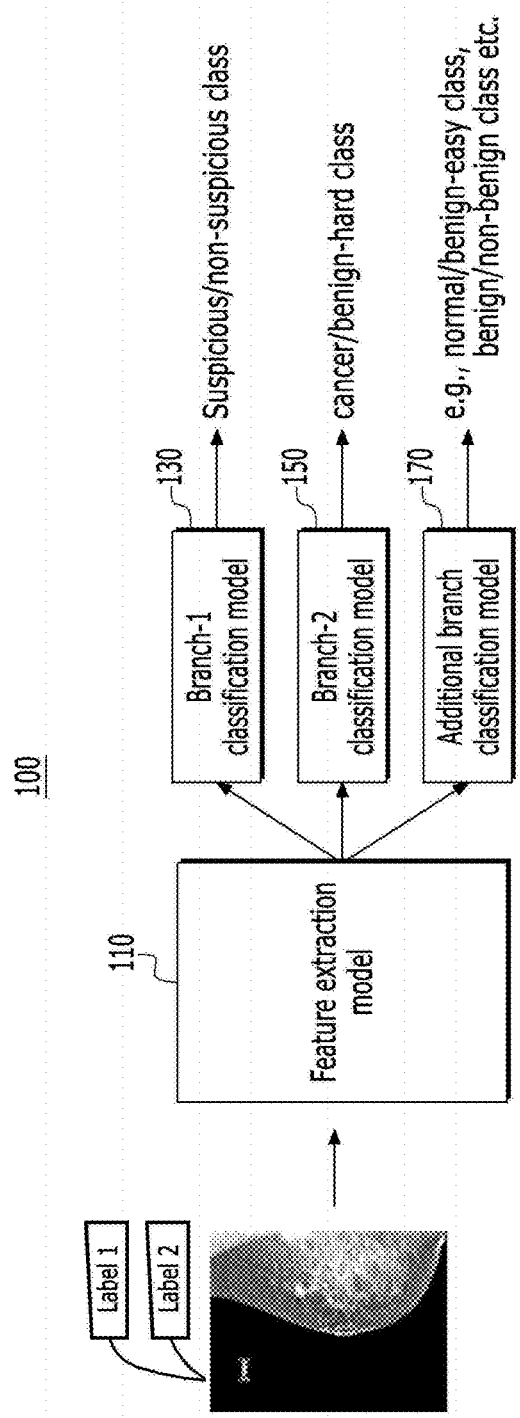
FIG. 3 is a diagram for explaining a method for independently training an AI model according to an embodiment.

FIG. 2 is a conceptual diagram for explaining a method for training an AI model according to an embodiment, and FIG. 3 is a diagram for explaining independent learning of an AI model according to an embodiment.

Referring to FIG. 2, the AI model 100 may include a feature extraction model 110 (hereinafter, referred to as "feature extractor") and branch classification models 130, 150 and 170, and a computing device 10 trains each of the models 110 130, 150, and 170 according to classification tasks by using training data 20. The training data 20 includes medical images are annotated with normal, benign-easy, benign-hard, and cancer, and grouped into higher classification classes of non-suspicious and suspicious. The medical images may be annotated with labels of being non-suspicious or being suspicious. The number of branch classification models may be variously selected according to at least one of a classification class and model design.

The feature extractor 110 is a neural network model that extracts a feature of an input image, and may include a convolutional neural network (CNN) model. The feature extractor 110 may be trained to detect various types of lesions from the input image. For example, the feature extractor 110 may learn to extract a feature for detecting a lesion from an input image, and may extract a feature for detecting a lesion from an input image.

A branch-1 classification model 130 learns a task to classify input image features into suspicious and non-suspicious using the entire training data 20. For example, the branch-1 classification model 130 may learn a task to classify input image features into suspicious and non-suspicious based on the features extracted by the feature extractor 110. The branch-1 classification model 130 may output a probability of being suspicious (p(suspicious)) of the input image features. The branch-1 classification model 130 may be composed of a fully-connected layer (512×1) that fully connects input image features and an activation function (e.g., a sigmoid function) that outputs the probability p(suspicious).

A branch-2 classification model 150 learns a task to classify input image features into malignant and benign-hard using images having a label of being suspicious among the entire learning data 20. For example, the branch-2 classification model 150 may learn a task to classify the input image features into malignant and benign-hard based on the features extracted by the feature extractor 110. The branch-2 classification model 150 may include a fully-connected layer 512×1 that fully connects input image features and an activation function (e.g., a sigmoid function).

In addition to the branch-1 classification model 130 and the branch-2 classification model 150, the computing device 100 may train at least one additional branch classification model 170. The additional branch classification model 170 will be described below.

Referring to FIG. 3, the computing device 10 trains a neural network model where each of the branch-1 classification model 130, the branch-2 classification model 150, and the additional branch classification model 170 is connected to the extractor 110, respectively. During training, the convolutional layers of the feature extractor 110 are shared and the features output from the feature extractor 110 diverge and are input into branch classification models performing each task. The training of each branch classification model proceeds according to the label of the input training data.

The feature extractor 110 learns a task to extract a feature from an input image and outputs the extracted feature. The feature of the input image may be a feature for detecting a lesion in the input image. The extracted feature is input into the branch classification models 130, 150, and 170. Here, the branch classification model to be trained may be varied according to the label of the input image. Features and labels (suspicious, non-suspicious) of the entire training data 20 are input into the branch-1 classification model 130 that learns a task to classify the input image features into suspicious and non-suspicious, and the branch-1 classification model 130 performs classification learning to output a label mapped to each feature (suspicious, non-suspicious). The features and labels (benign-hard, cancer) of the suspicious group among the entire training data 20 are input into the branch-2 classification model 150 that learns the task to classify the input image features into benign-hard and malignant. Then, the branch-2 classification model 150 performs classification learning to output a label mapped to each feature (benign-hard, cancer).

More specifically, the feature extractor 110 and the branch classification models 130, 150, and 170 constituting the AI model 100 may be trained as below-described by the computing device 10.

The feature extractor 110 is a neural network model composed of convolutional layers that extract a feature of an input image and learns to extract a feature for detecting lesions in an image using the entire training data 20. The feature extractor 110 may be implemented with, for example, a CNN-based ResNet, and the dimension of an output feature map may be 512.

The branch-1 classification model 130 learns to classify an input image into non-suspicious and suspicious using images and labels of the entire training data 20. The training data 20 may be images annotated with non-suspicious and images annotated with suspicious. That is, the branch-1 classification model 130 learns a classification task of the upper class using the entire training data 20.

The branch-1 classification model 130 may output a classification result corresponding to being suspicious as POSITIVE, and may output the probability p(suspicious). The branch-1 classification model 130 may be composed of a fully-connected layer (512×1) that fully connects input image features and an activation function (e.g., a sigmoid function) that outputs the probability p(suspicious).

The branch-2 classification model 150 learns to classify an input image into cancer and benign-hard, by using features and labels of the suspicious group among the entire training data 20. The suspicious group may be images annotated with being benign-hard or cancer. That is, the branch-2 classification model 150 learns a classification task of a lower class using only images classified as suspicious among the entire training data 20.

The branch-2 classification model 150 may output the classification result corresponding to cancer as POSITIVE. The branch-2 classification model 150 may be composed of a fully-connected layer (512×1) that fully connects input image features, and an activation function (e.g., a sigmoid function). At this time, since the branch-2 classification model 150 distinguishes cancer from the suspicious group, the activation function may output a conditional probability p(cancer|suspicious) that is a probability of cancer under an assumption of being suspicious.

The additional branch classification model 170 may learn a classification task using images and labels selected from the entire training data 20 according to the corresponding classification task. For example, the additional branch classification model 170 may use images annotated with normal or benign-easy among the entire training data 20 to perform learning to classify the input images into normal and benign-easy. Meanwhile, the additional branch classification model 170 may learn to distinguish a benign lesion from an input image using images annotated with benign (benign-easy, benign-hard) and others (normal or malignant) among the entire training data 20. The additional branch classification model 170 also may include a layer that fully connects input image features and an activation function.

As described above, each of the branch classification models 130, 150, and 170 constituting the AI model 100 independently performs learning through training data suitable for corresponding classification tasks. Therefore, when training the AI model 100, learning may be not concentrated on an easier task and each of the branch-1 classification model 130 and the branch-2 classification model 150 may learn the corresponding task in a balanced manner.

The independently trained branch classification models may output the probability of being suspicious p(suspicious) and the probability of being classified as cancer p(cancer|suspicious) for a detected lesion. Depending on the classification result of the branch-1 classification model 130 that is an upper classification model, the classification results of the branch-2 classification model 150 or the additional branch classification model 170 that are lower classification models may or may not be reflected in the interpretation result. Through this hierarchical classification, the AI model 100 may classify lesions of the input medical image into various classes.

Figure 4:
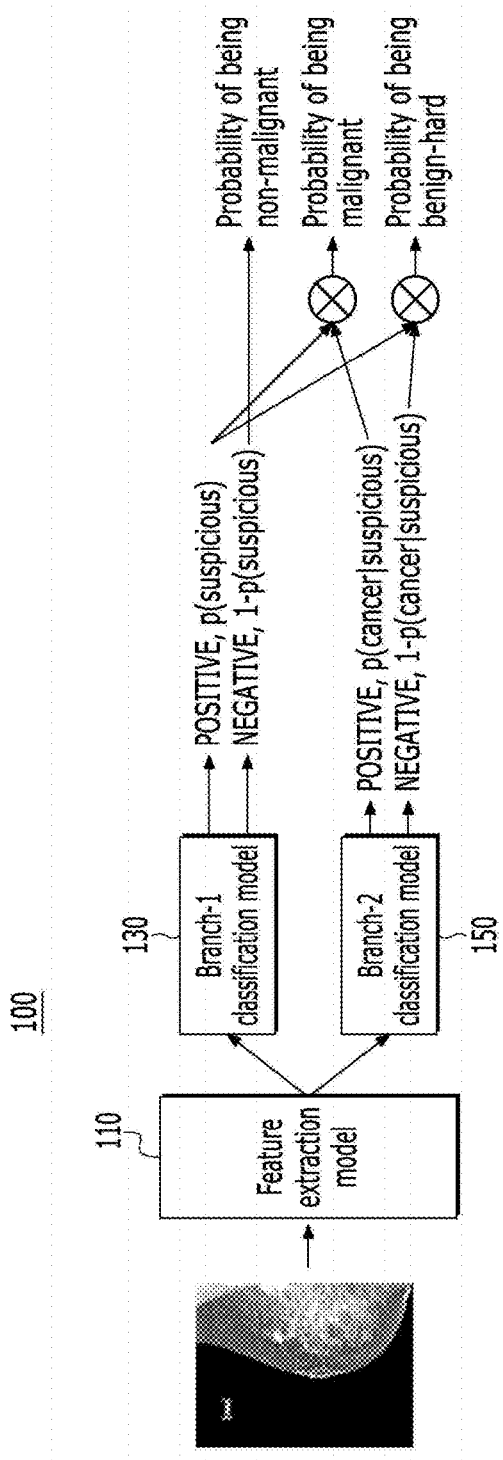
FIG. 4 is a conceptual diagram for explaining a hierarchical classification method using an AI model according to an embodiment.

FIG. 4 is a conceptual diagram for explaining a hierarchical classification method using an AI model according to an embodiment.

Referring to FIG. 4, the AI model 100 may be implemented as a structure where classification models selected according to classification classes are combined.

For example, the AI model 100 includes a feature extractor 110 that extracts a feature of the input medical image, a branch-1 classification model 130 that classifies the feature extracted by the feature extractor 110 into non-suspicious and suspicious, and a branch-2 classification model 150 that classifies the feature extracted by the feature extractor 110 into benign-hard and cancer. Additionally, the AI model 100 may further include an additional branch classification model (not shown) that classifies the feature extracted by the feature extractor 110 into normal and benign-easy.

The feature extractor 110 is a neural network model trained to extract a feature for detecting a lesion from an input image and outputs the feature of the input image. The neural network model may be a convolutional neural network (CNN) model and may be implemented with, for example, a CNN-based ResNet.

The branch-1 classification model 130 is a model trained with a task to classify the input image features into suspicious and non-suspicious and may output the classification result as POSITIVE and the probability p(suspicious) when it is classified as suspicious.

The branch-2 classification model 150 is a model trained with a task to classify input image features into cancer and benign-hard and may output POSITIVE as the classification result when it is classified into cancer. Since the branch-2 classification model 150 is trained to distinguish a malignant lesion from the training images classified as suspicions, branch-2 classification model 150 may output the conditional probability p(cancer|suspicious) that represent a probability to be classified as cancer under an assumption that the input image is suspicious.

Additionally, the AI model 100 may further include an additional branch classification model (not shown) that classifies features firstly classified as non-suspicious into normal and benign-easy under the branch-1 classification model.

As described above, the AI model 100 is composed of classification models 130 and 150 selected according to the classification classes and outputs classification results for the input image from each of the classification models. The classification results may include indication of POSITIVE/NEGATIVE for lesions, and POSITIVE probability/NEGATIVE probability.

The computing device 10 checks whether the lesion detected in the input image is suspicious using the classification result output from the AI model 100, and subsequently determines whether the lesion is benign or malignant when it is determined to be suspicious.

That is, if the classification result of the branch-1 classification model 130 is suspicious, the computing device 10 determines whether the lesion is cancer or benign through checking the classification result of the branch-2 classification model 150. If the classification result of the branch-1 classification model 130 is non-suspicious, the computing device 10 outputs a probability of being non-suspicious without checking the classification result of the branch-2 classification model 150. If the classification result of the branch-1 classification model 130 is suspicious, the classification result of the branch-2 classification model 150 is effectively reflected in the interpretation result. However, if the classification result of the branch-1 classification model 130 is non-suspicious, the classification result of the branch-2 classification model 150 is not reflected in the interpretation result.

Through this hierarchical classification, the computing device 10 may output an interpretation result representing whether the detected lesion is suspicious or not. Further, when the detected lesion is determined to be suspicious, the computing device 10 may output an interpretation result representing whether the detected lesion is cancer or benign-hard which means a suspicious lesion is determined to be benign through additional examinations. Hereinafter, for convenience of description, it will be described that the computing device 10 trains the AI model 100 and outputs an interpretation result for an analysis target image using the trained AI model 100. However, the computing device 10 training the AI model 100 may differ from a computing device outputting the interpretation result by using the trained AI model 100.

For a lesion that is classified as suspicious by the branch-1 classification model 130 and classified as cancer in the branch-2 classification model 150, the computing device 10 may output an interpretation result including a probability of being suspicious and a probability of cancer of the lesion, which are calculated as shown in Table 1. Further, for a lesion that is classified as suspicious by the branch-1 classification model 130 and classified as being-hard by the branch-2 classification model 150, the computing device 10 may output an interpretation result including a probability of being suspicious and a probability of being benign-hard of the lesion, that are calculated as shown in Table 1. The probability of being suspicious p(suspicious) may be obtained in the branch-1 classification model 130. A conditional probability p(cancer|suspicious) representing a probability of a lesion being classified as malignant under a condition of being suspicious may be obtained in a branch-2 classification model 150. In the interpretation result, the probability of being benign-hard may be referred to as a probability of cancer.

TABLE 1

| Interpretation result information | Probability calculation |
|---|---|
| Probability of being suspicious | p(suspicious) |
| Probability of cancer | p(suspicious) * p(cancer \| suspicious) |
| Probability of being benign-hard | p(suspicious) * (1-p(cancer \| suspicious)) |

As described above, the branch-2 classification model 150 of the AI model 100 learns and outputs the classification results independently from the branch-1 classification model 130, but the depending on the classification result of the branch-1 classification model 130 the classification result is reflected in the interpretation result. In particular, since the POSITIVE probability output from the branch-2 classification model 150 is a conditional probability representing a probability being determined as malignant under an assumption of being suspicious, a value of the probability of cancer is equal to or lower than the probability of being suspicious p(suspicious). For example, when the probability of being suspicious is 0.7, the probability of cancer becomes 0.7*p(cancer|suspicious), so the value is always 0.7 or less. Therefore, the probability of being suspicious and the probability of cancer for a lesion do not conflict.

In addition, when the lesion included in the input image is determined as being non-suspicious, the computing device 10 may output an interpretation result distinguishing whether the lesion is malignant, benign-easy, or normal through an additional branch classification model. For a lesion that is classified as being non-suspicious by the branch-1 classification model 130 and classified as being benign-easy or normal in the additional branch classification model, the computing device 10 may output an interpretation result including a probability of being non-suspicious, a benign probability, and a probability of being benign-easy calculated as shown in Table 2. In the interpretation result, the probability of being benign-easy may be simply output as the probability of being benign.

TABLE 2

| Interpretation result information | Probability calculation |
|---|---|
| Probability of being non-suspicious | 1-p(suspicious) |
| Probability of being benign-easy | (1-p(suspicious)) * p(benign \| non-suspicious) |
| Probability of being normal | (1-p(suspicious)) * (1-p(benign \| non-suspicious)) |

Thus, the computing device 10 providing the interpretation result of the input image through the trained AI model 100 provides, as an interpretation result, not only a cancer lesion but also a benign-hard lesion that is determined as being suspicious but predicted to be determined as being benign in additional examinations. In addition, through the AI model 100 where classification models selected according to the classification class are combined, the computing device 10 may obtain a valid classification result according to the hierarchy of the classification class among the classification results of the classification models and provides various interpretation results of the input image using the valid classification results.

Accordingly, the computing device 10 that provides various classification classes including benign-hard as an interpretation result may improve the reliability of the interpretation result by indicating that the suspicious lesion is analyzed without being missed. In addition, the patient may be not required to get through additional examinations for the suspicious lesions.

Figure 5:
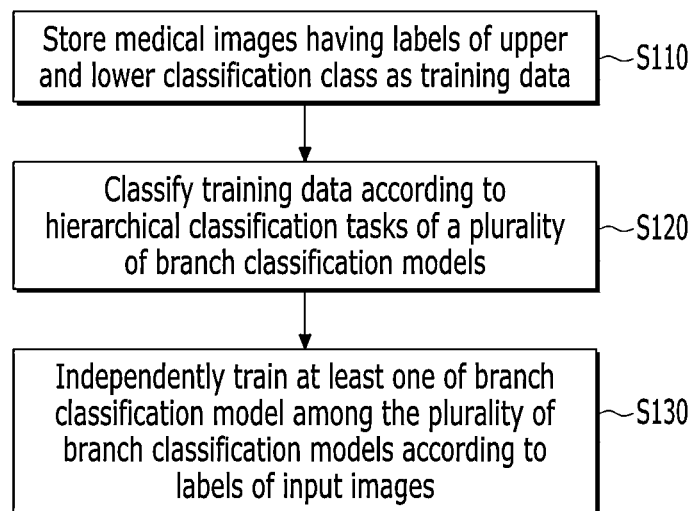
FIG. 5 is a flowchart showing a method for training an AI model to distinguish suspicious lesions from a medical image according to an embodiment.

FIG. 5 is a flowchart showing a method for training an AI model to distinguish suspicious lesions from a medical image according to an embodiment.

Referring to FIG. 5, the computing device 10 stores medical images having labels of upper classification class and lower classification class for lesions as learning data (S110). The lower classification classes for the lesion may be, for example, normal, benign-easy, benign-hard, and cancer. The upper classification classes may be suspicious and non-suspicious, and the images annotated with lower classification classes of normal and benign-easy are grouped into a non-suspicious class. Images annotated with lower classification class of benign-hard and cancer are grouped into a suspicious class.

The computing device 10 classifies the training data according to hierarchical classification tasks of a plurality of branch classification models (S120). The plurality of branch classification models are parallel connected to the feature extractor 110 of the AI model 100, and the hierarchical classification tasks may be variously configured.

The computing device 10 trains independently at least one branch classification model among the plurality of branch classification models according to the label of the input image (S130). The computing device 10 may construct a model where features output from the feature extractor 110 diverge and are transmitted into each of a plurality of branch classification models and train the feature extractor 110 and the plurality of branch classification models.

The entire training data may be used as a training data of a task to classify the input image into non-suspicious and suspicious and a label corresponding to an upper classification class may be used for supervised learning. Accordingly, the computing device 10 diverges the features of the entire training data output from the feature extractor 110 into the branch-1 classification model 130 as shown in FIG. 3, and may train the branch-1 classification model 130 to classify the input features as corresponding labels (non-suspicious, suspicious).

As the training data of a task to classify the input images into malignant and benign-hard, the images included in the suspicious group among the entire training data may be used, and the label corresponding to the classification class (lower class) for the lesion may be used for supervised learning. Therefore, the computing device 10 diverges the feature of the suspicious group among the features of the entire training data output from the feature extractor 110 into the branch-2 classification model 150 and may train the branch-2 classification model 150 to classify the input features as corresponding labels (benign-hard, malignant).

The training data of a task to classify input images into normal and benign-hard is images included in the non-suspicious group among the entire training data and a label corresponding to a classification class (lower classification class) for the lesion may be used for supervised learning. Accordingly, the computing device 10 may diverge the feature of the non-suspicious group among the features of the entire training data output from the feature extractor 110 into the additional branch classification model 170 and may train the additional branch classification model 170 to classify the input features as the corresponding labels (normal, benign-easy).

When training a plurality of branch classification models constituting the AI model 100 is completed, the AI model 100 may be implemented in a structure where classification models selected according to the classification class are combined.

Figure 6:
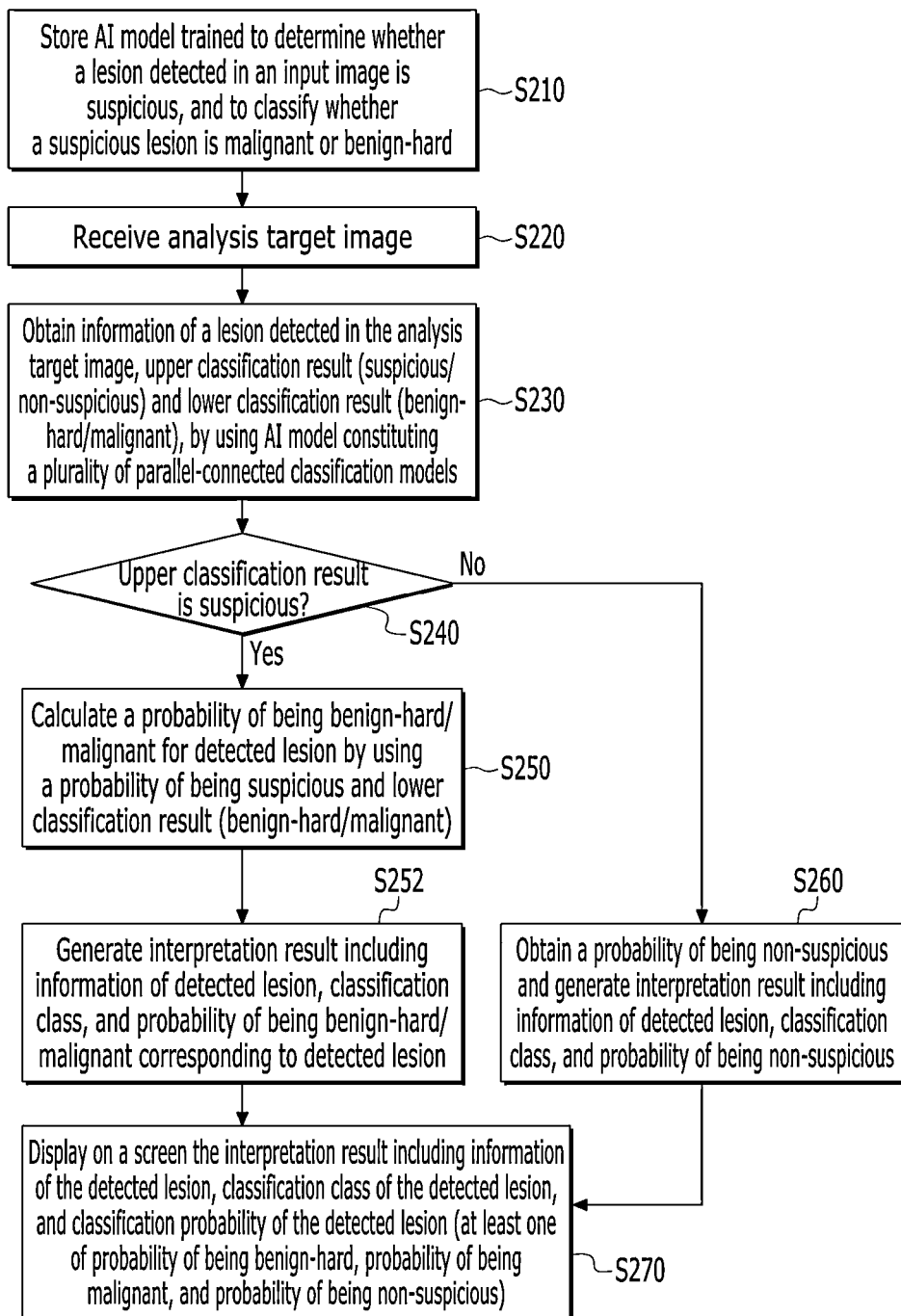
FIG. 6 is a flowchart showing a method for providing an interpretation result of a medical image using an AI model according to an embodiment.

FIG. 6 is a flowchart showing a method for providing an interpretation result of a medical image using an AI model according to an embodiment.

Referring to FIG. 6, the computing device 10 determines whether the lesion (target lesion) detected in an input image is a suspicious lesion and stores an AI model 100 trained to classify the suspicious lesion as malignant or benign (S210). For example, the AI model 100 may include the feature extractor 110, a branch-1 classification model 130 that receives input image features output from the feature extractor 110 and then classifies them as non-suspicious and suspicious, and the branch-2 classification model 150 that receives input image features and classifies them as benign-hard and malignant under a condition of being suspicious.

The computing device 10 receives an analysis target image (S220).

The computing device 10 obtains information on the detected lesion (location, etc.) of the analysis target image, upper classification result (suspicious/non-suspicious) and lower classification result (benign-hard/malignant) for the detected lesion by using the AI model 100 configured with a plurality of parallel-connected classification models (S230).

The computing device 10 determines whether the upper classification result obtained by the AI model 100 is suspicious (S240). The computing device 10 first checks the result of the classification model outputting the upper classification class among the plurality of classification models constituting the AI model 100.

When the upper classification result is determined as suspicious, the computing device 10 calculates the probability of being benign-hard/malignant for the detected lesion by using the probability of being suspicious and the lower classification result (benign-hard/malignant) as shown in Table 1 (S250).

The computing device 10 generates an interpretation result including information on the lesion detected in the analysis target image, the classification class, and the probability of being benign-hard/malignant corresponding to the detected lesion (S252). The interpretation result may further include the probability of being suspicious. The classification class may include a classification class for each layer. For example, the classification class may include "suspicious" that is a classification class of the upper layer (a first layer), and "benign-hard" or "cancer" that are classification classes of the lower layer (a second layer).

When the upper classification result is non-suspicious, the computing device 10 obtains a probability of being non-suspicious and generates an interpretation result including information on the lesion detected in the analysis target image, a classification class, and a probability of being non-suspicious (S260). The classification class may be "non-suspicious". If the AI model 100 further includes an additional branch model for performing sub-classification of being non-suspicious, the interpretation result provided for the non-suspicious lesion may further include a lower classification result of being non-suspicious.

The computing device 10 may output on a screen the interpretation result including the information on the detected lesion, the classification class of the detected lesion and a classification probability of the detected lesion (for example, at least one of a probability of being suspicious, a probability of being benign-hard, a probability of being malignant, and a probability of being non-suspicious) (S270). When the detected lesion is classified as malignant, the computing device 10 may provide a location of the malignant lesion and the probability of being malignant as an interpretation result. Further, when the detected lesion is determined as benign but still belongs to a suspicious lesion, the computing device 10 may provide the information indicating that the detected lesion is a benign-hard lesion, the probability of being suspicious, and the probability of being benign-hard as an interpretation result. When the detected lesion belongs to a non-suspicious lesion, the computing device 10 may provide information indicating that the detected lesion is a non-suspicious lesion and a probability of being non-suspicious as an interpretation result. If there is no lesion detected in the analysis target image, the computing device 10 may provide an interpretation result thereabout.

As described above, the computing device 10 may make an indication on the detected lesion by classification classes in an interpretation result display. In particular, when the detected lesion is suspicious but classified as benign-hard, the computing device 10 may provide an indication of being benign-hard or benign for the lesion.

Figure 7:
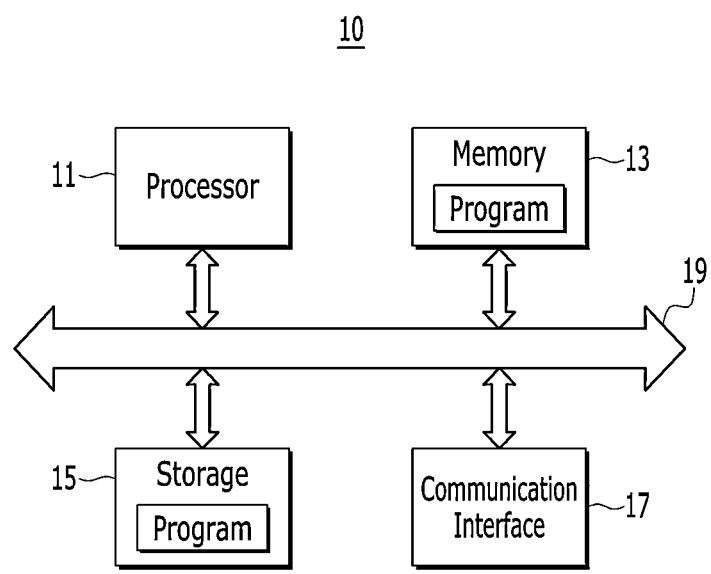
FIG. 7 is a configuration diagram of a computing device according to an embodiment.

FIG. 7 is a configuration diagram of a computing device according to an embodiment.

Referring to FIG. 7, the computing device 10 may include one or more processors 11, a memory 13 to which a computer program to be executed by the processor 11 is loaded, a storage 15 which stores the program and various data, and a communication interface 17, and a bus 19 to connect them. In addition, various elements may be included in the computing device 10. The program may include instructions which cause the processor 11 to perform methods or operations according to various embodiments of the present disclosure when loaded to the memory 13. In other words, the processor 11 may execute methods or operations according to various embodiments of the present disclosure by performing the instructions. The program includes a series of computer-readable instructions that are grouped by function and are executed by a processor.

The processor 11 controls overall operation of each element of the computing device 10. The processor 11 may be configured to include at least one of a central processing unit (CPU), a microprocessor unit (MPU), a microcontroller unit (MCU), a graphics processing unit (GPU), and any form of processor well known in the technical field of the present disclosure. The processor 11 may perform calculation of at least one application or program for executing methods or operations according to embodiments of the present disclosure.

The memory 13 stores various kinds of data, commands, and/or information. To execute methods or operations according to various embodiments of the present disclosure, the memory 13 may load one or more programs from the storage 15. The memory 13 may be implemented as a volatile memory such as a random access memory (RAM), but the technical scope of the present disclosure is not limited thereto.

The storage 15 may non-temporarily store the program. The storage 15 may include a non-volatile memory such as a read only memory (ROM), an erasable programmable ROM (EPROM), an electrically erasable programmable ROM (EEPROM), and a flash memory, and a like, a hard disk, a removable disk, or any form of computer-readable recording medium well known in the art to which the present disclosure pertains.

The communication interface 17 supports wired or wireless Internet communication of the computing device 10. Further, the communication interface 17 may support various communication methods as well as Internet communication. To this end, the communication interface 17 may include a communication module well known in the technical field of the present disclosure.

The bus 19 provides a communication function between elements of the computing device 200. The bus 19 may be implemented as various forms of buses, such as an address bus, a data bus, a control bus, and the like.

The embodiments of the present invention described above are not implemented through only the apparatus and the method, but may also be implemented through a program that realizes functions corresponding to the configuration of the embodiments of the present invention or a recording medium on which the program is recorded.

Though the present invention has been illustrated and described with reference to embodiments thereof, the right scope of the present invention is not limited thereto. Further, it will be understood by a person of ordinary skill in the art that various changes in form and detail may be made therein without departing from the spirit and scope of the present invention as defined by the following claims.

What is claimed is:

1. A method for interpreting an input image by a computing device operated by at least one processor, the method comprising:
receiving a target image;
using an artificial intelligent (AI) model, obtaining at least one classification class of a target lesion detected in the target image; and
outputting an interpretation result including the at least one classification class of the target lesion and at least one classification probability of the target lesion, one or each of the at least one classification probability indicating a probability that the target lesion is classified into one or each of the at least one classification class by the AI model.

2. The method of claim 1, wherein the AI model includes a first AI model classifying a lesion as a suspicious class or a non-suspicious class, and a second AI model classifying a lesion as a malignant class or a benign-hard class.

3. The method of claim 2, wherein the AI model further includes a third AI model classifying an input image as a normal class or a benign class.

4. The method of claim 1, wherein the interpretation result indicates the target lesion by classification classes in an interpretation result display.

5. The method of claim 1, wherein the interpretation result includes a location of the target lesion and a probability of being malignant, when the target lesion is classified as a malignant class.

6. The method of claim 1, wherein the interpretation result includes information indicating that the target lesion is a benign-hard lesion, and a probability of being suspicious or a probability of being benign-hard, when the target lesion is classified as a suspicious class and a benign class.

7. The method of claim 1, wherein the interpretation result includes information indicating that the target lesion is a non-suspicious lesion and a probability of being non-suspicious, when the target lesion is classified as a non-suspicious class.

8. The method of claim 1, further comprising
outputting an interpretation result including information that the no lesion is detected in the target image, when the target image is classified as a normal class.

9. The method of claim 1, wherein the at least one classification class includes at least one of a non-suspicious class, a suspicious class, a normal class, a benign class, a malignant class, a benign-hard class, or a benign-easy class.

10. A computing device comprising:
a non-transitory memory storage that stores instructions; and
a processor that executes the instructions, wherein the processor receives a target image,
using an artificial intelligent (AI) model, obtains at least one classification class of a target lesion detected in the target image, and
outputs an interpretation result including the at least one classification class of the target lesion and at least one classification probability of the target lesion, one or each of the at least one classification probability indicating a probability that the target lesion is classified into one or each of the at least one classification class by the AI model.

11. The computing device of claim 10, wherein the AI model includes a first AI model classifying a lesion as a suspicious class or a non-suspicious class, and a second AI model classifying a lesion as a malignant class or a benign-hard class.

12. The computing device of claim 11, wherein the AI model further includes a third AI model classifying an input image as a normal class or a benign class.

13. The computing device of claim 10, wherein the interpretation result indicates the target lesion by classification classes in an interpretation result display.

14. The computing device of claim 10, wherein the interpretation result includes a location of the target lesion and a probability of being malignant, when the target lesion is classified as a malignant class.

15. The computing device of claim 10, wherein the interpretation result includes information indicating that the target lesion is a benign-hard lesion, and a probability of being suspicious or a probability of being benign-hard, when the target lesion is classified as a suspicious class and a benign class.

16. The computing device of claim 10, wherein the interpretation result includes information indicating that the target lesion is a non-suspicious lesion and a probability of being non-suspicious, when the target lesion is classified as a non-suspicious class.

17. The computing device of claim 10, wherein the processor outputs an interpretation result including information that the no lesion is detected in the target image, when the target image is classified as a normal class.

18. The computing device of claim 10, wherein the at least one classification class includes at least one of a non-suspicious class, a suspicious class, a normal class, a benign class, a malignant class, a benign-hard class, or a benign-easy class.

* * * * *